US006427014B1

(12) United States Patent
Eastty

(10) Patent No.: US 6,427,014 B1
(45) Date of Patent: Jul. 30, 2002

(54) MICROPHONE

(75) Inventor: Peter Charles Eastty, Eynsham (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/177,800

(22) Filed: Oct. 23, 1998

(30) Foreign Application Priority Data

Oct. 24, 1997 (GB) ............................................. 9722548

(51) Int. Cl.[7] .......................... H04R 3/00; H04R 19/04; H04B 10/00; H04B 10/02

(52) U.S. Cl. ....................... 381/111; 381/369; 359/149; 359/150

(58) Field of Search .................................. 381/111, 369

(56) References Cited

U.S. PATENT DOCUMENTS

| | | | | |
|---|---|---|---|---|
| 4,395,593 A | | 7/1983 | Flanagan | 179/1 |
| 5,051,799 A | | 9/1991 | Paul et al. | 375/25 |
| 5,548,658 A | * | 8/1996 | Ring et al. | 381/191 |
| 5,621,806 A | * | 4/1997 | Page et al. | 381/172 |

* cited by examiner

*Primary Examiner*—Forester W. Isen
*Assistant Examiner*—Elizabeth McChesney
(74) *Attorney, Agent, or Firm*—Frommer Lawrence & Haug LLP; William S. Frommer; Gordon Kessler

(57) ABSTRACT

This is a design for a microphone which directly outputs a one-bit digital audio signal. No electronic analogue-to-digital converter is required.

6 Claims, 2 Drawing Sheets

MICROPHONE

BACKGROUND OF THE INVENTION

1. Field of the Ivention

This invention relates to microphones.

2. Description of the Prior Art

Known microphones convert an analogue sound waveform (i.e. physical variations in air pressure) into an analogue electrical audio signal. If a digital audio signal is required, the analogue signal has to be converted by a digital to analogue converter (DAC) into the digital audio signal.

This extra stage of analogue to digital conversion requires extra components and, more importantly, is not a lossless process. In other words, some of the information contained in the original analogue audio signal is lost by the conversion process, through conversion errors or noise.

It would be desirable to provide a microphone which generates a digital audio signal directly from the air pressure variations representing the actual sound.

SUMMARY OF THE INVENTION

This invention provides a microphone comprising:

a diaphragm movable in response to incident sound waves;

a position sensor for generating an electrical position signal indicative of the position of the diaphragm;

a thresholder for generating a one-bit digital signal indicating whether the position signal is above or below a threshold signal level;

a delay for delaying the digital signal; and a diaphragm driver for moving the diaphragm in response to the digital signal and in an opposite sense to the motion of the diaphragm represented by the digital signal.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
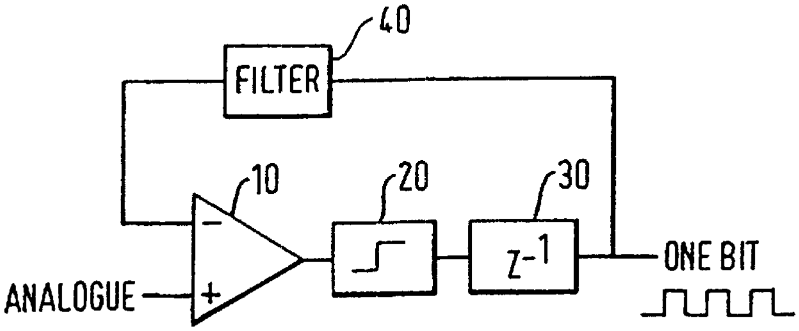
FIG. 1 (PRIOR ART)
FIG. 1 is a schematic diagram of a delta-sigma modulator.

A known delta-sigma modulator is illustrated in FIG. 1. An input analogue signal is supplied to a comparator 10 and from there to a feedback loop comprising a thresholder 20, a delay 30 and a filter 40. A one-bit signal representing the analogue signal is output by the delay 30.

The microphone according to embodiments of the invention uses a similar principle to generate a one bit signal directly from physical sound vibrations.

Figure 2:
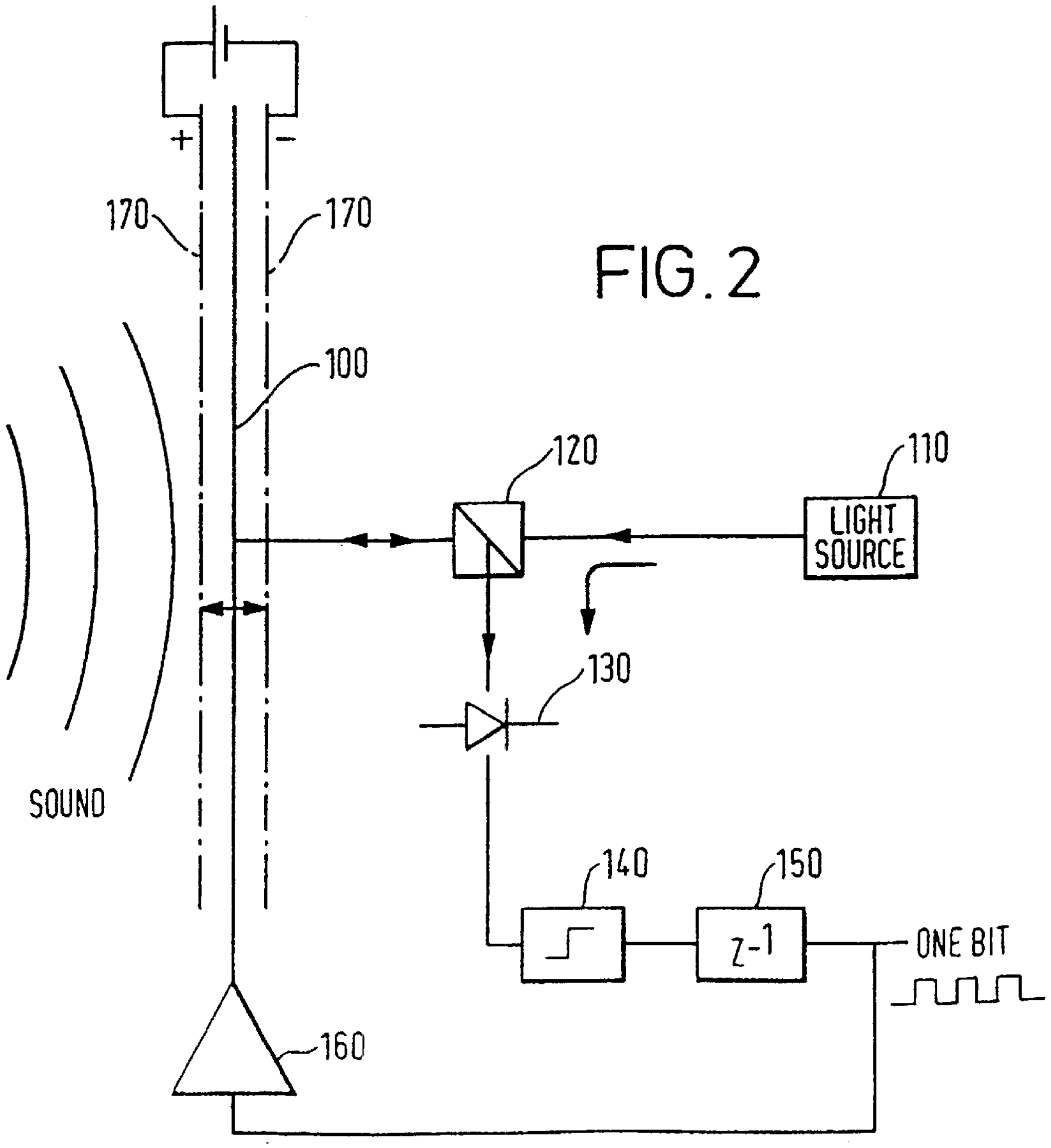
FIG. 2 is a schematic diagram of a microphone according to a first embodiment of the invention.

In FIG. 2, a diaphragm 100 vibrates in response to incident sound waves. The motion of the diaphragm is sensed by an interferometer formed of a light source 110 directing a beam of light via a beam splitter 120 on to the diaphragm. A reference beam is also diverted from the beam splitter onto a photodiode 130.

Light reflected from the diaphragm is diverted by the beam splitter onto the photodiode 130 where it is combined with the reference beam and converted to an electrical signal indicative of changes in the position of the diaphragm. The electrical signal is processed by a thresholder 140 and a delay 150 before being amplified by an amplifier 160.

In other embodiments, two light beams in quadrature phase relationship could be used, to give an improved position sensing facility.

The diaphragm 100 is positioned between two charged plates 170. The diaphragm is electrically conductive, and so an electrostatic force is applied to the diaphragm by the interaction of the signal output by the amplifier 160 (which charges the diaphragm) with the charged plates 170. This part of the device operates in a similar manner to a known electrostatic loudspeaker.

So, by comparing FIGS. 1 and 2 it can be seen that the microphone acts in the same way as the DSM of FIG. 1, except that:

(a) the action of the filter 40 is provided by the mechanical response of the diaphragm 100; and (b) the action of the comparator 10 is provided by the opposite responses of the diaphragm to incoming sound waves (an analogue signal) and the electrostatic forces applied by interaction with the charged plates 170.

Accordingly, a one-bit signal representing the incoming sound signal is output from the delay 150.

Figure 3:
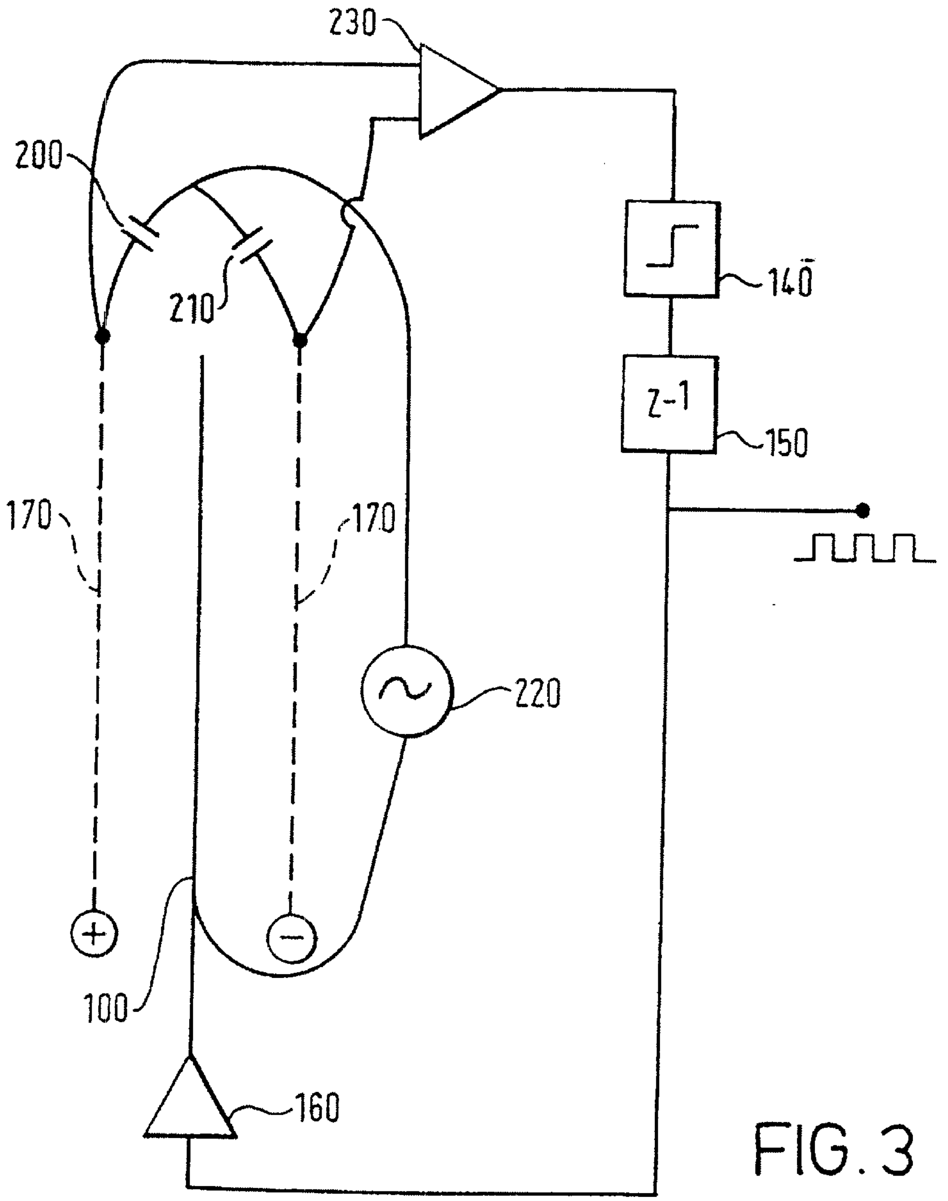
FIG. 3 is a schematic diagram of a microphone according to a second embodiment of the invention.

FIG. 3 schematically illustrates a microphone according to a second embodiment of the invention.

In FIG. 3, several of the parts 100, 140, 150, 160 and 170 are the same as those shown in FIG. 2. However, rather than using an optical position sensor to detect the position of the diaphragm, a capacitative sensor is employed.

The capacitative sensing technique makes use of the capacitance between the diaphragm 100 and each of the plates 170. A bridge arrangement is formed by connecting two further capacitors 200, 210, of nominally identical capacitance, across the plates 170.

A radio frequency (rf) source 220 is connected between the output of the driving amplifier 160 and the junction of the capacitors 200, 210. The frequency of the rf source is selected to be well outside of the audio band—perhaps 5 MHz. A differential amplifier 230 is connected across the two plates 170, with its output providing a position signal for input to the thresholder 140 as before.

Figure 4:
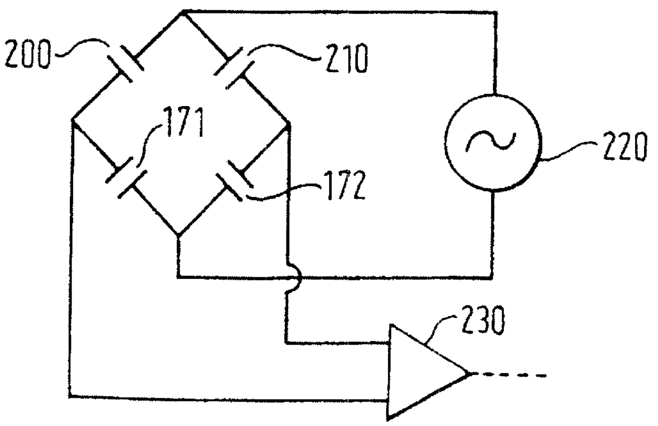
FIG. 4 is a schematic equivalent circuit to a part of FIG. 3.

An equivalent circuit is illustrated schematically in FIG. 4, where the capacitance between the diaphragm 100 and the plates 170 is illustrated as schematic capacitors 171, 172.

As the diaphragm moves to one side, one of the capacitances 171, 172 increases and the other decreases. In this standard bridge arrangement, a voltage is developed across the inputs to the differential amplifier 230 indicative of the change in position of the diaphragm. This forms the position signal which is processed as described above with reference to FIG. 2.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A microphone comprising:

(i) a diaphragm movable in response to incident sound waves;

(ii) a position sensor for generating an electrical position signal indicative of said position of the diaphragm;

(iii) a thresholder for generating a one-bit digital signal indicating whether said position signal is above or below a threshold signal level;

(iv) a delay for delaying said digital signal; and (v) a diaphragm driver for moving said diaphragm in response to said digital signal and in an opposite sense to motion of said diaphragm represented by said digital signal.

2. A microphone according to claim 1, in which said position sensor is an optical position sensor.

3. A microphone according to claim 1, in which said position sensor is a capacitative position sensor.

4. A microphone according to claim 3, in which said diaphragm driver comprises one or more electrically charged plates adjacent to said diaphragm, and a driver circuit for supplying an electrical signal to said diaphragm in dependence on said delayed digital signal.

5. A microphone according to claim 4, in which said position sensor comprises means for detecting a change in a capacitance between said one or more plates and said diaphragm.

6. A microphone according to claim 5, comprising two charged plates disposed on opposite sides of said diaphragm, a capacitance between each charged plate and said diaphragm forming a respective arm in a bridge measuring circuit.

* * * * *